United States Patent
Shi et al.

(10) Patent No.: US 8,571,291 B2
(45) Date of Patent: Oct. 29, 2013

(54) COMBINATION WEIGHT APPLIED TO ITERATIVE RECONSTRUCTION IN IMAGE RECONSTRUCTION

(75) Inventors: Daxin Shi, Vernon Hills, IL (US); Yu Zou, Naperville, IL (US); Alexander Zamyatin, Hawthorn Woods, IL (US)

(73) Assignees: Kabushiki Kaisha Toshiba, Tokyo (JP); Toshiba Medical Systems Corporation, Tochigi-Ken (JP)

( * ) Notice: Subject to any disclaimer, the term of this patent is extended or adjusted under 35 U.S.C. 154(b) by 20 days.

(21) Appl. No.: 13/276,609

(22) Filed: Oct. 19, 2011

(65) Prior Publication Data

US 2013/0101190 A1   Apr. 25, 2013

(51) Int. Cl.
*G06K 9/00* (2006.01)
*A61B 6/00* (2006.01)

(52) U.S. Cl.
USPC ............................................. 382/131; 378/4

(58) Field of Classification Search
USPC .......... 382/128–134; 378/4, 21–27, 101, 901;
600/407, 410, 425, 427; 128/920, 922
See application file for complete search history.

(56) References Cited

U.S. PATENT DOCUMENTS

| 7,439,739 | B2 * | 10/2008 | Beatty | 324/309 |
|---|---|---|---|---|
| 7,526,060 | B2 | 4/2009 | Ziegler | |
| 8,175,115 | B2 * | 5/2012 | Thibault et al. | 382/131 |
| 2011/0150305 | A1 * | 6/2011 | Zeng et al. | 382/131 |

OTHER PUBLICATIONS

Thibault, J., Sauer, K.D., Bouman, C.A., Hsieh, J., A three dimensional statisical approach to improved image quality for multislice helical CT, Med. Phys. 34 (11), Nov. 2007, pp. 4526-4544.
Li, X., Ni, J., and Wang, G., Parallel iterative cone beam CT image reconstruction on a PC cluster, Journal of X-Ray Science and Technology, 13 (2005), pp. 63-72.
Wang, G., Jiang, M., Ordered subset simultaneous algebraic reconstruction techniques (OS-SART), Journal of X-Ray Science and Technology, 12 (2004), pp. 169-177.
Andersen, A.H., and Kak, A.C., Simultaneous Algebraic Reconstruction Technique (SART): A Superior Implementation of the Art Algorithm, Ultrasonic Imaging 6 (1984), pp. 81-94.
Zeng, K., De Man, B., and Thibault, J., Correction of Iterative Reconstruction Artifacts in Helical Cone-beam CT, 10 International Meeting on Fully Three-Dimensional Image Reconstruction in Radiology and Nuclear Medicine (2009), pp. 242-245.
Kohler, T., Proska, R., and Nielsen, T., SNR-Weighted ART to Transmission Tomography, Nuclear Science Symposium Conference Record, IEEE, Oct. 2003, vol. 4, pp. 2739-2742.

* cited by examiner

*Primary Examiner* — Abolfazl Tabatabai
(74) *Attorney, Agent, or Firm* — Yoshida & Associates, LLC (57) ABSTRACT

The image generation method and system generates an image using a predetermined iterative reconstruction technique, and an instance of the iteration process is weighted according to a predetermined combination of weights during the reconstruction. The predetermined combination of the weights includes weights based upon a predetermined noise model and a predetermined window function to improve image quality.

12 Claims, 6 Drawing Sheets

COMBINATION WEIGHT APPLIED TO ITERATIVE RECONSTRUCTION IN IMAGE RECONSTRUCTION

FIELD OF THE INVENTION

The current invention is generally related to an image processing and system, and more particularly related to the application of combination weights to iterative reconstruction techniques such as Algebraic Reconstruction Technique (ART), Simultaneous Algebraic Reconstruction Technique (SART) and Ordered-subset Simultaneous Algebraic Reconstruction Technique (OS-SART).

BACKGROUND OF THE INVENTION

For volume image reconstruction, an iterative algorithm has been developed by various groups and includes a total variation (TV) minimization iterative reconstruction algorithm. Iterative reconstruction additionally involves Algebraic Reconstruction Technique (ART), Simultaneous Algebraic Reconstruction Technique (SART) or Ordered-subset Simultaneous Algebraic Reconstruction Technique (OS-SART).

Prior art has attempted some use of weights in iterative reconstruction processes. For example, the reconstruction of the image was performed iteratively, wherein the updates were weighted with the intrinsic statistical error of the measured photon counts as disclosed in U.S. Pat. No. 7,526,060. The exemplary weight is the statistical uncertainty of a Poisson distribution. In another example, the reconstruction of the image was performed iteratively, wherein the updates were weighted with a predetermined window weighting function as disclosed in "Correction of Iterative Reconstruction Artifacts in Helical Cone-Beam CT," by Zeng et al. 10th International Meeting on Fully Three-Dimensional Image Reconstruction in Radiology and Nuclear Medicine P. 242 (2009).

Other prior art techniques include signal to noise ratio (SNR) for weighting during iterative reconstruction. For example, the detector readings are properly weighted with respect to each other according to their SNR based upon a confidence measure that is inversely proportional to an estimate of the SNR of the line integral during ART or SART. "SNR-Weighted ART Applied to Transmission Tomography," Kohler et al., Nuclear Science Symposium Conference Record, IEEE (2003).

Other prior art techniques yet further include a longitudinal Hamming window in weighing image reconstruction in conjunction with ART or SART algorithms. The length of the window is varied for suppressing noise based upon the number of points describing the part of the ray cut by the reconstruction circle. "Simultaneous Algebraic Reconstruction Technique (SART)" Andersen et al., Ultrasonic Imaging 6, 81-94 (1984).

Despite the above prior art efforts, the noise suppressions and the artifact reductions remain generally separated and conflicting in weighted iterative reconstruction techniques.

DETAILED DESCRIPTION OF THE PREFERRED EMBODIMENT(S)

Figure 1:
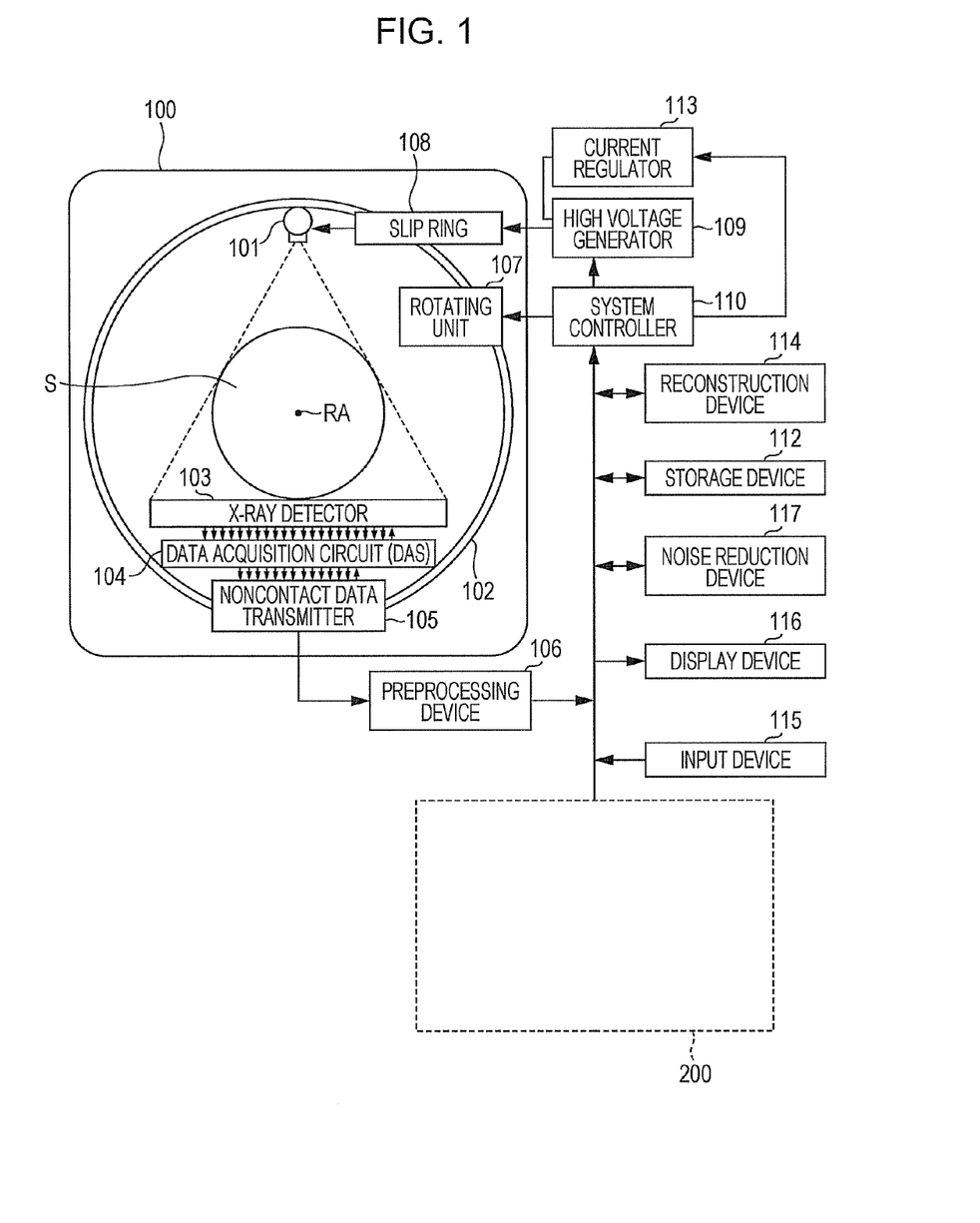
FIG. 1 is a diagram illustrating one embodiment of the multi-slice X-ray CT apparatus or scanner according to the current invention.

Referring now to the drawings, wherein like reference numerals designate corresponding structures throughout the views, and referring in particular to FIG. 1, a diagram illustrates one embodiment of the multi-slice X-ray CT apparatus or scanner according to the current invention including a gantry 100 and other devices or units. The gantry 100 is illustrated from a side view and further includes an X-ray tube 101, an annular frame 102 and a multi-row or two-dimensional array type X-ray detector 103. The X-ray tube 101 and X-ray detector 103 are diametrically mounted across a subject S on the annular frame 102, which is rotatably supported around a rotation axis RA. A rotating unit 107 rotates the frame 102 at a high speed such as 0.4 sec/rotation while the subject S is being moved along the axis RA into or out of the illustrated page.

The multi-slice X-ray CT apparatus further includes a high voltage generator 109 that applies a tube voltage to the X-ray tube 101 through a slip ring 108 so that the X-ray tube 101 generates X ray. The X rays are emitted towards the subject S, whose cross sectional area is represented by a circle. The X-ray detector 103 is located at an opposite side from the X-ray tube 101 across the subject S for detecting the emitted X rays that have transmitted through the subject S.

Still referring to FIG. 1, the X-ray CT apparatus or scanner further includes other devices for processing the detected signals from X-ray detector 103. A data acquisition circuit or a Data Acquisition System (DAS) 104 converts a signal output from the X-ray detector 103 for each channel into a voltage signal, amplifies it, and further converts it into a digital signal. The X-ray detector 103 and the DAS 104 are configured to handle a predetermined total number of projections per rotation (TPPR) that can be at the most 900 TPPR, between 900 TPPR and 1800 TPPR and between 900 TPPR and 3600 TPPR.

The above described data is sent to a preprocessing device 106, which is housed in a console outside the gantry 100 through a non-contact data transmitter 105. The preprocessing device 106 performs certain corrections such as sensitivity correction on the raw data. A storage device 112 then stores the resultant data that is also called projection data at a stage immediately before reconstruction processing. The storage device 112 is connected to a system controller 110 through a data/control bus, together with a reconstruction device 114, display device 116, input device 115, and the scan plan support apparatus 200. The scan plan support apparatus 200 includes a function for supporting an imaging technician to develop a scan plan.

One embodiment of the reconstruction device 114 further includes various software and hardware components. According to one aspect of the current invention, the reconstruction device 114 of the CT apparatus advantageously minimizes total variation (TV) using an iterative reconstruction technique. In general, the reconstruction device 114 in one embodiment of the current invention operates the total variation iterative reconstruction (TVIR) algorithm, which performs on the projection data an ordered subset simultaneous algebraic reconstruction technique (OS-SART) step and a TV minimization step. The two steps are sequentially implemented in the main loop where a number of iterations were prescribed.

Before the TV minimization step, the projection data undergoes an ordered subsets simultaneous algebraic reconstruction technique (OS-SART). The projection data is grouped into a predetermined number of subsets N each having a certain number of views. During the ordered subsets simultaneous algebraic reconstruction technique (OS-SART), each subset may be sequentially processed in one embodiment. In another embodiment, a plurality of the subsets may be processed in parallel by taking advantage of certain microprocessor such as multiple central processing units (CPU) or a graphics processing unit (GPU).

During the ordered subsets simultaneous algebraic reconstruction technique (OS-SART), the reconstruction device 114 also performs two major operations. Namely, for each subset N, the reconstruction device 114 re-projects the image volume to form the computed projection data and back-projects the normalized difference between the measured projection and the computed projection data to reconstruct an updated image volume. In further detail, one embodiment of the reconstruction device 114 re-projects the image volume by using the ray tracing technique where no coefficient of the system matrix is cached. Moreover, one embodiment of the reconstruction device 114 simultaneously re-projects all rays in a subset, and this is optionally implemented in parallel. In the back-projection, one embodiment of the reconstruction device 114 uses a pixel-driven technique to back-project all of the normalized difference projection data in a subset to form the desired updated image volume. Because the reconstruction device 114 back-projects all ray sums, i.e., difference projection data, in a subset to form an image volume, this operation is optionally implemented in parallel too. These operations are applied to every subset N to complete a single OS-SART step. This and other embodiments are optionally included in the current scope of the invention as more particularly claimed in the appended claims.

In the total variation (TV) minimization step, one embodiment of the reconstruction device 114 employs a line search strategy to search a positive step size so as to ensure the objective function of the current image volume to be smaller than that of the previous image volume.

One embodiment of the current invention further includes various software modules and hardware components for substantially reducing streak and or noise in computer tomography images using a predetermined filter. According to one aspect of the current invention, a noise reduction device 117 of the CT apparatus advantageously performs the noise and or streak reduction. In one embodiment, the noise reduction device 117 is operationally connected to other software modules and or system components such as the storage device 112, the reconstruction device 114, the display device 116 and the input device 115 via a data/control bus. In this regard, the noise reduction device 117 alone does not necessarily perform noise reduction functions and or their associated tasks in other embodiments according to the current invention. Furthermore, the noise reduction device 117 is optionally a part of other devices such as the reconstruction device 114 in alternative embodiments according to the current invention.

In general, projection data in CT is available after a predetermined log-conversion process. The log-conversion process converts measured X-ray intensity signals that have been attenuated by a scanned object into line integral data. Subsequently, CT images are reconstructed from the line integral data by known methods of mathematical inversion. In one exemplary embodiment of the noise/streak reduction system according to the current invention, the noise reduction device 117 converts the projection data back into original x-ray intensity data or photon count measurements. In this case, the noise reduction device 117 needs some information on the system calibration process in the conversion step. Alternatively, the noise reduction device 117 has a direct access to the measured X-ray intensity signals.

The noise reduction device 117 determines noise variance (V) of the after-log data based upon the X-ray intensity signals or photon counts. The noise variance is computed such that the noise will be equalized after the log-conversion process.

To understand the effect of logarithmic conversion on the measured data, the noise model is examined with respect to variance before and after the log conversion. Before-log noise variance $Var_{BL}$ is estimated by a before-log noise model as defined in Equation (1):

$$Var_{BL} = V_e + WI \tag{1}$$

where $Var_{BL}$ is the total before-log noise variance, $V_e$ is the electronic noise variance, and I is the mean count. W is the detector gain that is function of channels, segments, a data acquisition system (DAS) and or collimation. On the other hand, after-log noise variance Var is estimated by an after-log noise model as defined in Equation (2):

$$Var_{AL} = \frac{Var_{BL}}{I^2} \tag{2}$$

Both of the above equations are disclosed in "Adaptive streak artifact reduction in CT resulting from excessive x-ray photon noise", Jiang Hsieh (GE), *Med. Phys.* 25 (11), 2139-47, 1998.

By the same token, the noise reduction device 117 also performs tasks related to determine a weighting function to be used during an iterative reconstruction process before reconstruction. In certain embodiments, the noise reduction device 117 determines a window function that is related to motion weighting which is an important task for improving an image of non-stationary organs such as the heart and lungs according to the current invention. One exemplary window function is based upon the detectors. Furthermore, in other embodiments, the reconstruction device 114 optionally determines a window weighting function before or during an iterative reconstruction process.

Still referring to FIG. 1, either or both of the noise reduction device 117 and the reconstruction device 114 apply a combination of the predetermined weights to an instance of the image during an iterative reconstruction process. The weights are generated in advance and stored in one embodiment. Alternatively, the weights are generated on the fly in another embodiment. In general, the combination weights are generated using at least two functions based upon a predetermined noise model and a predetermined window function according to the current invention. One exemplary combination weight is based upon $\text{Var}_{AL}$, the after-log noise variance as defined in Equation (2) and a smoothed PI window function to be described with respect to FIG. 4B.

Figure 2:
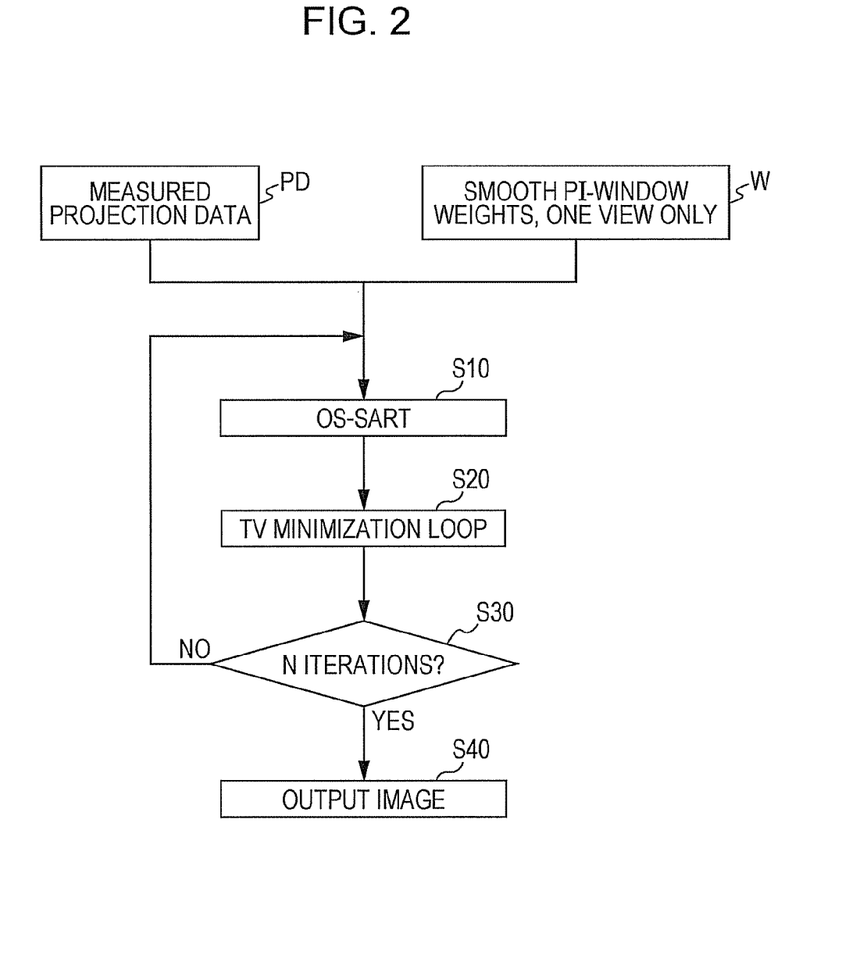
FIG. 2 is a flow chart illustrating a prior art use of a predetermined window function before an iterative reconstruction process.

Now referring to FIG. 2, a flow chart illustrates a prior art use of a predetermined window function before an iterative reconstruction process in comparison to the use of a combination weight during the iterative reconstruction process in one embodiment according to the current invention. Projection data PD has been acquired, and a predetermined window function W is applied to the projection data PD prior to a predetermined iterative reconstruction process. In other words, the measured projection data is weighted to generate the weighed projection data before image reconstruction. In a step S10, a first loop includes the ordered subsets simultaneous algebraic reconstruction technique (OS-SART). For example, a reconstruction device performs in the step S10 two major operations. Namely, for each subset N, the reconstruction device re-projects the image volume to form the computed projection data and back-projects the normalized difference between the measured projection and the computed projection data to reconstruct an updated image volume. In further detail, one embodiment of the reconstruction device re-projects the image volume by using the ray tracing technique where no coefficient of the system matrix is cached. Moreover, one embodiment of the reconstruction device simultaneously re-projects all rays in a subset, and this is optionally implemented in parallel. In the back-projection, one embodiment of the reconstruction device uses a pixel-driven technique to back-project all of the normalized difference projection data in a subset to form the desired updated image volume. Because the reconstruction device back-projects all ray sums, i.e., difference projection data, in a subset to form an image volume, this operation is optionally implemented in parallel. These operations are applied to every subset N to complete a single OS-SART step.

In any case, while the project data PD is initially weighted before the iterative process, OS-SART is not weighted by the window function as shown below by Equation (3).

$$x_j^{(n+1)} = x_j^{(n)} + \lambda_n \left( \frac{\sum_i a_{i,j} \left( \frac{\left(b_i - \sum_k a_{i,k} x_k^{(n)}\right)}{\sum_k a_{i,k}} \right)}{\sum_i a_{i,j}} \right) \quad (3)$$

where $x_j^{(n+1)}$ is an updated image from an old image $x_j^{(n)}$, $\lambda_n$ is a relaxation factor, $a_{i,j}$ is an element of the system matrix, and $b_i$ is weighted data of the measured projection data at an ith detector bin.

Still referring to FIG. 2, the prior art use of a predetermined window function before an iterative reconstruction process further performs the total variation (TV) minimization in step S20. For example, one embodiment of the reconstruction device 114 employs a line search strategy to search a positive step size so as to ensure the objective function of the current image volume to be smaller than that of the previous image volume. The above described steps S10 and S20 are iterated for a predetermined number of times, and step S30 determines if the predetermined number of iterations has been performed. If the step S30 determines that the predetermined number of iterations has not been achieved, the iterative process further repeats the steps S10 and S20 on the updated image. On the other hand, if the step S30 determines that the predetermined number of iterations has been achieved, the iterative process now outputs the updated image in step S40.

Figure 3:
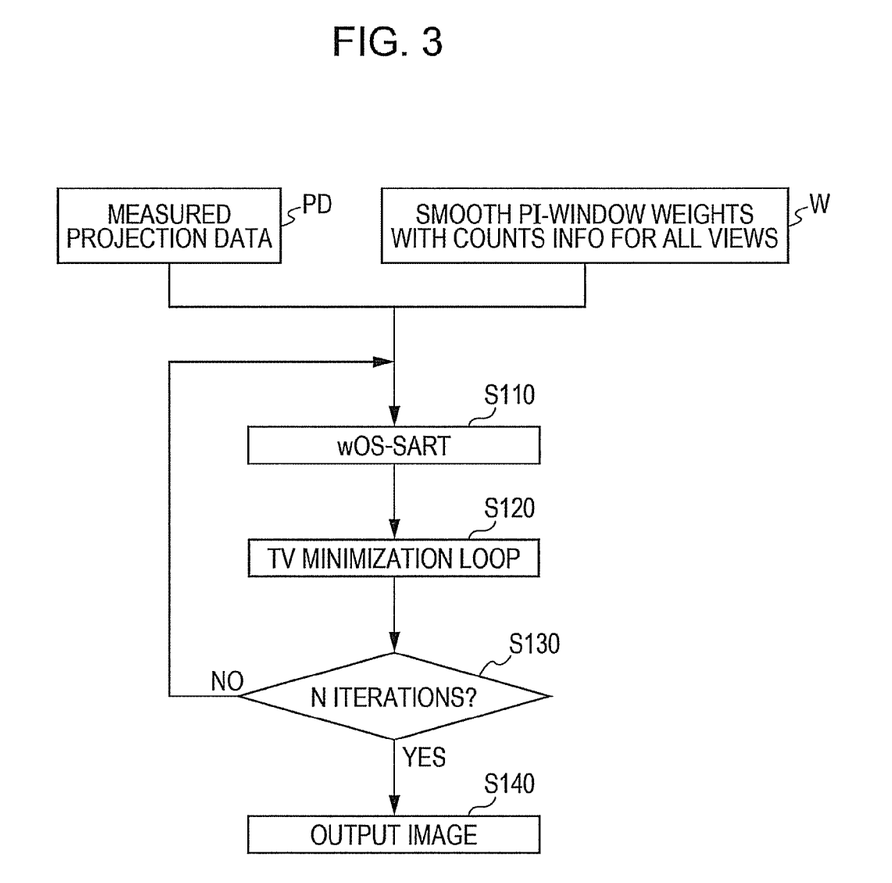
FIG. 3 is a flow chart illustrating the use of a combination weight during the iterative reconstruction process in one embodiment according to the current invention.

Now referring to FIG. 3, a flow chart illustrates a use of a combination weight including a predetermined window function and a noise variance function during an iterative reconstruction process in one embodiment according to the current invention. Projection data PD has been acquired, and a predetermined combination weight has been generated for each of the projections and stored in a storage device in one embodiment. Alternatively, the combination weight is generated on the fly as it is applied in another embodiment. For example, a combination weight is based upon a predetermined smoothed PI window function and a predetermined noise variance function. During a step S110 of image reconstruction, the combination weight is applied to the difference between the measured projection and the computed projection at each projection bin and at each instance of iteration in an iteration loop that performs the ordered subsets simultaneous algebraic reconstruction technique (OS-SART). For example, the reconstruction device 114 in the step S110 for each subset N re-projects the image volume to form the computed projection data and back-projects the normalized difference between the measured projection and the computed projection data to reconstruct an updated image volume. In fact, the reconstruction device 114 in one exemplary process of the step S110 retrieves a corresponding one of the stored combination weights and applies it to the above normalized difference of each instance in each subset N. In another exemplary process of the step S110, the reconstruction device 114 generates a corresponding one of the stored combination weights and applies it to the above normalized difference of each instance in each subset N.

In further detail, one embodiment of the reconstruction device 114 re-projects the image volume by using the ray tracing technique where no coefficient of the system matrix is cached. Moreover, one embodiment of the reconstruction device 114 simultaneously re-projects all rays in a subset, and this is optionally implemented in parallel. In the back-projection, one embodiment of the reconstruction device 114 uses a pixel-driven technique to back-project all of the normalized difference projection data in a subset to form the desired updated image volume. Because the reconstruction device 114 back-projects all ray sums, i.e., difference projection data, in a subset to form an image volume, this operation is optionally implemented in parallel.

OS-SART is weighted by the predetermined combination weight in one embodiment of the current invention. In other embodiments, other iterative reconstruction techniques such as SART, ART and SIRT are optionally weighted by a predetermined combination weight. OS-SART is weighted by the combination weight d, as shown below in Equation (4) at each instance of iteration during its reconstruction.

$$x_j^{(n+1)} = x_j^{(n)} + \lambda_n \left( \frac{\sum_i a_{i,j} \left( \frac{d_i \left(b_i - \sum_k a_{i,k} x_k^{(n)}\right)}{\sum_k a_{i,k}} \right)}{\sum_i a_{i,j} d_i} \right) \quad (4)$$

where $x_j^{(n+1)}$ is an updated image from an old image $x_j^{(n)}$, $\lambda_n$ is a relaxation factor, $a_{i,j}$ is an element of the system matrix, and $b_i$ is after-log data of the measured projection data at an ith detector bin. In further detail, one exemplary combination weight $d_i$ is defined by Equation (5):

$$d_i = w_i / V_i \quad (5)$$

where $w_i$ the predetermined window function $V_i$ is the predetermined noise model.

Still referring to FIG. 3, the iterative reconstruction process further performs the total variation (TV) minimization in step S120. For example, one embodiment of the reconstruction device 114 employs a line search strategy to search a positive step size so as to ensure the objective function of the current image volume to be smaller than that of the previous image volume. The above described steps S110 and S120 are iterated for a predetermined number of times, and step S130 determines if the predetermined number of iterations has been performed. If the step S130 determines that the predetermined number of iterations has not been achieved, the iterative process further repeats the steps S110 and S120 on the updated image. On the other hand, if the step S130 determines that the predetermined number of iterations has been achieved, the iterative process now outputs the updated image in step S140.

Figure 4A:
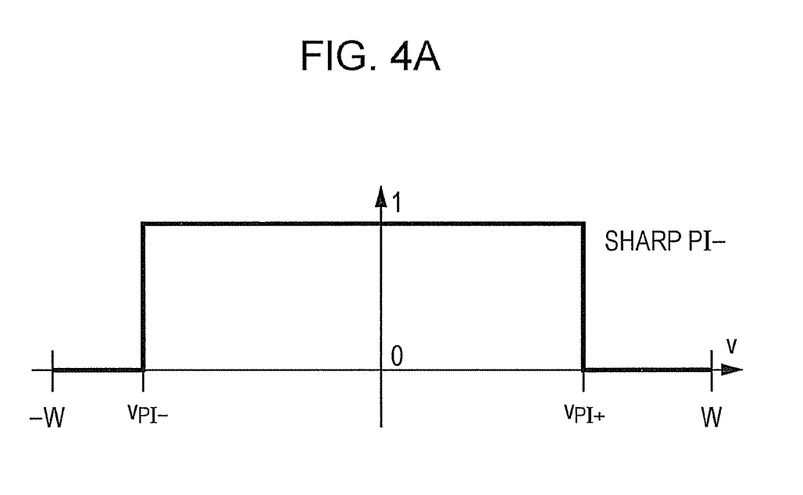
FIG. 4A is a diagram illustrating a column of the detector elements with respect a sharp PI window function.

Now referring to FIG. 4A, a column of the detector elements is illustrated with respect a sharp PI window function. Between its row between $V_{PI-}$ and $V_{PI+}$, the sharp window function outputs one while it outputs zero outside the range. Because of the above abrupt output characteristics, the corresponding weights are not smooth.

Figure 4B:
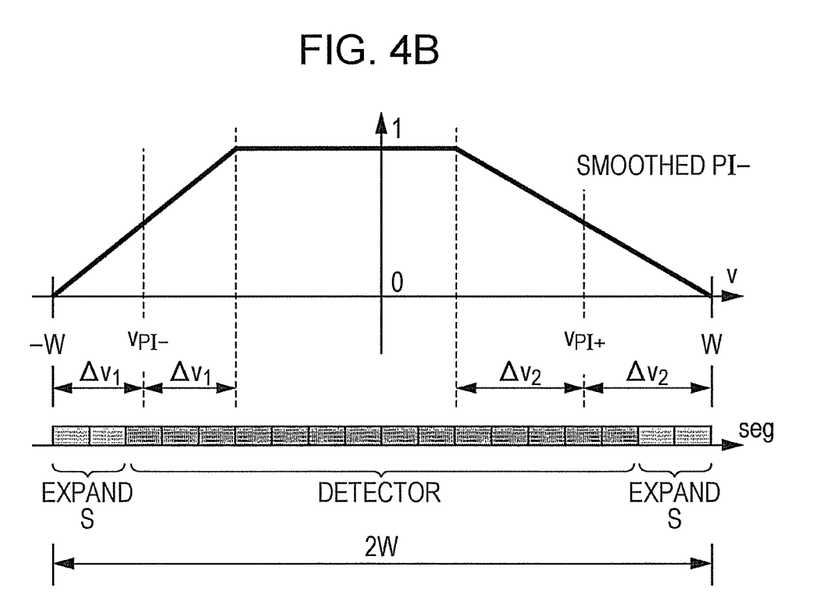
FIG. 4B is a diagram illustrating a column of the detector elements with respect a smoothed PI window function.

Now referring to FIG. 4B, a column of the detector elements is illustrated with respect to a predetermined smoothing interval. The detector is expanded to the detector height 2 W from its original size as illustrated in FIG. 4A that is less than the height 2 W. As illustrated, the smoothed PI function has a range of 2 W, which includes the portions that are marked as "expands." With the expanded height 2 W, a smoothing interval $\Delta v$ is also expanded so that the smoothing function now has a larger or smoother rate of change within the expanded height 2 W. The output transition between one and zero is smoothed out over the extended range 2 W.

One exemplary smoothed PI weighting function w is defined below. The smoothed PI window function is used as a part of combination weighting scheme.

$$w(\gamma, v) = \begin{cases} 0, & v \le v_{PI-} - \Delta v_1 \\ \frac{1}{2} + \frac{v - v_{PI-}}{2\Delta v_1}, & v_{PI-} - \Delta v_1 < v < v_{PI-} + \Delta v_1 \\ 1, & v_{PI-} + \Delta v_1 \le v \le v_{PI+} - \Delta v_2 \\ \frac{1}{2} - \frac{v - v_{PI+}}{2\Delta v_2}, & v_{PI+} - \Delta v_2 < v < v_{PI+} + \Delta v_2 \\ 0, & v \ge v_{PI+} + \Delta v_2 \end{cases}$$

where $(\gamma, v)$ are the detector coordinates. $\gamma$ is a fan angle while $v$ is a vertical coordinate. Other parameters are also defined as follows in one exemplary smoothed PI window function.

$$v_{PI+} = \frac{H}{4\pi} \frac{(\pi - 2\gamma)}{\cos\gamma}, v_{PI-} = \frac{H}{2\pi} \frac{(-\pi - 2\gamma)}{\cos\gamma} = -\frac{H}{4\pi} \frac{(\pi + 2\gamma)}{\cos\gamma},$$

$$\gamma = -(ch - Cch) \times d\gamma,$$

$$d\gamma = \frac{FanAngle}{180} \frac{\pi}{Nch},$$

$$FanAngle = 49.2°.$$

-continued $$\Delta v_1 = c \times (W + v_{PI-}),$$

$$\Delta v_2 = c \times (W - v_{PI+})$$

where Cch is the central ray of the projection data and has a value of 447.25. H is a predetermined helical pitch. c is a smoothing coefficient having a range of $0 \le c \le 1$. When c=0, the smoothed PI window function becomes the sharp PI-window. That is, 0% redundant data usage is realized. On the other hand, when c=1, the smoothed PI-window realizes 100% redundant data usage. By the same token, when c=0.5, it becomes a half-smoothed PI-window for 50% redundant data usage.

Figure 5A:
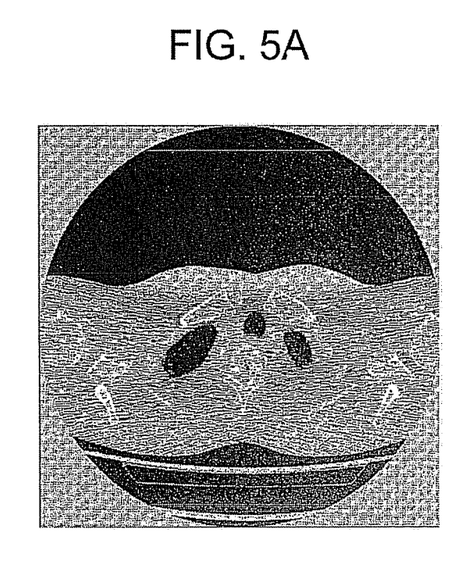
FIG. 5A illustrates an image that has been reconstructed with SART without any weighting scheme and the image exhibits the streak artifacts.
Figure 5B:
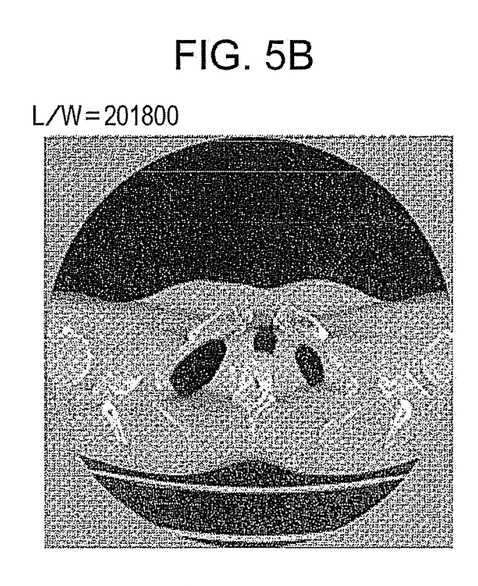
FIG. 5B illustrates an image that has been reconstructed with SART with the weighting scheme during the iterative reconstruction and the image exhibits a substantially reduced amount of the streak artifacts.

Now referring to FIGS. 5A and 5B, a diagram illustrates the effects of a weight on the streak artifacts in the shoulder image. FIG. 5A illustrates that since the image has been reconstructed by SART without any of the above described weighting scheme, the image exhibits the streak artifacts. On the other hand, FIG. 5B illustrates that since the image has been reconstructed by SART with the weighting scheme during the iterative reconstruction, the image exhibits a substantially reduced amount of the streak artifacts. The weighting scheme in FIG. 5B is only based upon noise variance and no PI-window function is applied since 2D fan-beam data is used in this example.

Figure 6A:
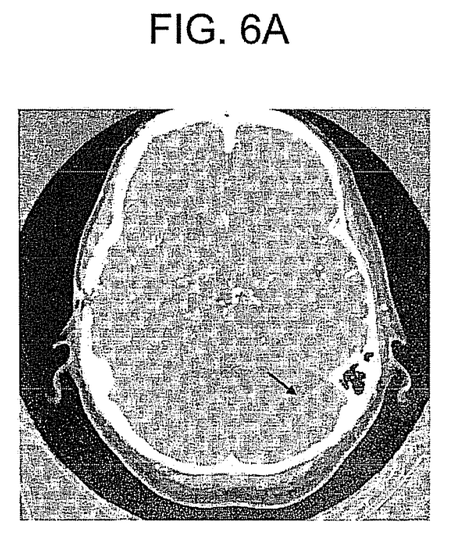
FIG. 6A illustrates an image has been reconstructed with SART without a simple weighting scheme, and the image exhibits the rotational helical artifacts.
Figure 6B:
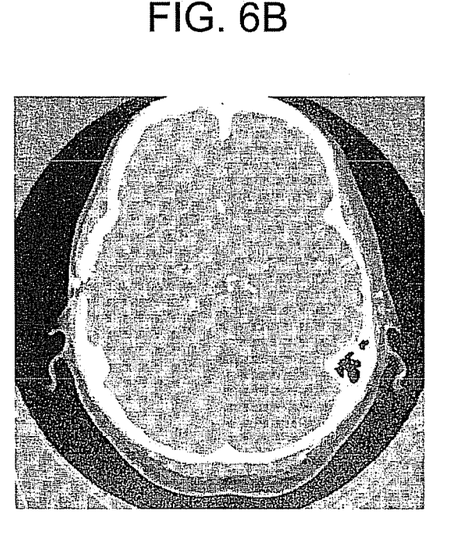
FIG. 6B illustrates an image has been reconstructed with SART with the above described combination weighting scheme during the iterative reconstruction, and the image exhibits a substantially reduced amount of the rotational helical artifacts.

Now referring to FIGS. 6A and 6B, a diagram illustrates the effects of the combination weight on the rotational helical artifacts in an image of the head region. FIG. 6A illustrates that since the image has been reconstructed by SART with only a predetermined noise variance model of the above described weighting scheme, the image exhibits rotational helical artifacts as indicated by an arrow. On the other hand, FIG. 6B illustrates that the image has been reconstructed by SART with the above described combination weighting scheme including the noise variance model and a predetermined smoothed PI window function during the iterative reconstruction, the image exhibits a substantially reduced amount of the rotational helical artifacts. As seen in the above exemplary application of the combination weight using a predetermined iterative reconstruction technique, an image quality may be substantially improved.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of generating an image, comprising the steps of:
   a) generating a combination weight value for measured projection data at each of measured projections based upon at least a predetermined noise model and a predetermined window function; and
   b) applying the combination weight values using the measured projection data in one of predetermined iterative reconstruction techniques while an image is being iteratively reconstructed, wherein the predetermined noise model is defined by V=(g I+Ve/I)/I, where the I is a measured signal while Ve and g are respectively the electronic noise variance and the detector gain that is function of channels, segments, a data acquisition system and or collimation.

2. The method of generating an image according to claim 1 wherein the predetermined window function is defined by a smooth PI weighting function w:

$$w(\gamma, v) = \begin{cases} 0, & v \leq v_{PI-} - \Delta v_1 \\ \frac{1}{2} + \frac{v - v_{PI-}}{2\Delta v_1}, & v_{PI-} - \Delta v_1 < v < v_{PI-} + \Delta v_1 \\ 1, & v_{PI-} + \Delta v_1 \leq v \leq v_{PI+} - \Delta v_2 \\ \frac{1}{2} - \frac{v - v_{PI+}}{2\Delta v_2} & v_{PI+} - \Delta v_2 < v < v_{PI+} + \Delta v_2 \\ 0, & v \geq v_{PI+} + \Delta v_2 \end{cases}$$

where ($\gamma$, v) are the detector coordinates, $\gamma$ being a fan angle while v being a vertical coordinate, $$v_{PI+} = \frac{H}{4\pi} \frac{(\pi - 2\gamma)}{\cos\gamma} \cdot v_{PI-} = \frac{H}{4\pi} \frac{(-\pi - 2\gamma)}{\cos\gamma} = -\frac{H}{4\pi} \frac{(\pi + 2\gamma)}{\cos\gamma},$$

$$\gamma = -(ch - Cch) \times d\gamma,$$

$$d\gamma = \frac{FanAngle}{180} \frac{\pi}{Nch},$$

$$FanAngle = 49.2°.$$

$$\Delta v_1 = c \times (W + v_{PI-}),$$

$$\Delta v_2 = c \times (W - v_{PI+}),$$

and c is a smoothing coefficient having a range of $0 \leq c \leq 1$.

3. The method of generating an image according to claim 1 wherein the predetermined iterative reconstruction techniques include algebraic reconstruction technique (ART) type algorithms, simultaneous algebraic reconstruction technique (SART) type algorithms, ordered-subset simultaneous algebraic reconstruction technique (OS-SART) type algorithms, simultaneous iterative reconstruction technique (SIRT) type algorithms, expectation maximization (EM) type algorithms and penalized least square type algorithms (PLS).

4. The method of generating an image according to claim 1 wherein the predetermined iterative reconstruction technique is ordered subset simultaneous algebraic reconstruction technique (OS-SART), which is weighted by the combination weight value as denoted by $d_i$ for ith measured projection of the measured projection data as:

$$x_j^{(n+1)} = x_j^{(n)} + \lambda_n \left( \frac{\sum_i a_{i,j} \left( \frac{d_i \left( b_i - \sum_k a_{i,k} x_k^{(n)} \right)}{\sum_k a_{i,k}} \right)}{\sum_i a_{i,j} d_i} \right)$$

where $x_j^{n+1}$ is an updated image from an old image $x_j^{(n)}$, $\lambda_n$ is a relaxation factor, $a_{i,j}$ is an element of the system matrix, and $b_i$ is after-log data of the measured projection data at an ith detector bin.

5. The method of generating an image according to claim 4 wherein the combination weight value $d_i$ is defined by $$d_i = \frac{w_i}{V_i}$$

where $w_i$ the predetermined window function $V_i$ is the predetermined noise model.

6. The method of generating an image according to claim 1 further comprising an additional step of performing image regularization.

7. A system for generating an image, comprising:
a noise reduction device for generating a combination weight value for measured projection data at each of measured projections based upon a combination of a predetermined noise model and a predetermined window function; and
a reconstruction device connected to said noise reduction device for applying the combination weight values using the measured projection data in one of predetermined iterative reconstruction techniques while an image is being iteratively reconstructed, wherein the predetermined noise model is defined by V=(g I+Ve/I)/I, where the I is a measured signal while Ve and g are respectively the electronic noise variance and the detector gain that is function of channels, segments, a data acquisition system and or collimation.

8. The system for generating an image according to claim 7 wherein the predetermined window function is defined by a smooth PI weighting function w:

$$w(\gamma, v) = \begin{cases} 0, & v \leq v_{PI-} - \Delta v_1 \\ \frac{1}{2} + \frac{v - v_{PI-}}{2\Delta v_1}, & v_{PI-} - \Delta v_1 < v < v_{PI-} + \Delta v_1 \\ 1, & v_{PI-} + \Delta v_1 \leq v \leq v_{PI+} - \Delta v_2 \\ \frac{1}{2} - \frac{v - v_{PI+}}{2\Delta v_2} & v_{PI+} - \Delta v_2 < v < v_{PI+} + \Delta v_2 \\ 0, & v \geq v_{PI+} + \Delta v_2 \end{cases}$$

where ($\gamma$, v) are the detector coordinates, $\gamma$ being a fan angle while v being a vertical coordinate, $$v_{PI+} = \frac{H}{4\pi} \frac{(\pi - 2\gamma)}{\cos\gamma} \cdot v_{PI-} = \frac{H}{4\pi} \frac{(-\pi - 2\gamma)}{\cos\gamma} = -\frac{H}{4\pi} \frac{(\pi + 2\gamma)}{\cos\gamma},$$

$$\gamma = -(ch - Cch) \times d\gamma,$$

$$d\gamma = \frac{FanAngle}{180} \frac{\pi}{Nch},$$

$$FanAngle = 49.2°.$$

$$\Delta v_1 = c \times (W + v_{PI-}),$$

$$\Delta v_2 = c \times (W - v_{PI+}),$$

and c is a smoothing coefficient having a range of $0 \leq c \leq 1$.

9. The system for generating an image according to claim 7 wherein the predetermined iterative reconstruction techniques include algebraic reconstruction technique (ART) type algorithms, simultaneous algebraic reconstruction technique (SART) type algorithms, ordered-subset simultaneous algebraic reconstruction technique (OS-SART) type algorithms, simultaneous iterative reconstruction technique (SIRT) type algorithms, expectation maximization (EM) type algorithms and penalized least square type algorithms (PLS).

10. The system for generating an image according to claim 7 wherein the predetermined iterative reconstruction technique is ordered subset simultaneous algebraic reconstruction technique (OS-SART), which is weighted by the combination weight value as denoted by $d_i$ for ith measured projection of the measured projection data as:

$$x_j^{(n+1)} = x_j^{(n)} + \lambda_n \left( \frac{\sum_i a_{i,j} \left( \frac{d_i \left( b_i - \sum_k a_{i,k} x_k^{(n)} \right)}{\sum_k a_{i,k}} \right)}{\sum_i a_{i,j} d_i} \right)$$

where $x_j^{(n+1)}$ is an updated image from an old image $x_j^{(n)}$, $\lambda_n$ is a relaxation factor, $a_{i,j}$ is an element of the system matrix, and $b_i$ is after-log data of the measured projection data at an ith detector bin.

11. The system for generating an image according to claim 10 wherein the combination weight value $d_i$ is defined by $$d_i = \frac{w_i}{V_i}$$

where $w_i$ the predetermined window function $V_i$ is the predetermined noise model.

12. The system for generating an image according to claim 1 further comprising an additional step of performing image regularization.

* * * * *